United States Patent [19]
Cornils et al.

[11] Patent Number: 5,711,119
[45] Date of Patent: Jan. 27, 1998

[54] DETACHABLE ADHESIVE MOUNTING OF A WINDOW PANE TO A FRAME

[75] Inventors: Gerd Cornils; Rolf Kötte; Petra Friede, all of Allemagne, Germany

[73] Assignee: Saint-Gobain Vitrage, Courbevoie, France

[21] Appl. No.: 595,703

[22] Filed: Feb. 2, 1996

[30] Foreign Application Priority Data

Feb. 2, 1995 [DE] Germany ............ 195 03 314.0

[51] Int. Cl.$^6$ .................................................. E06B 3/56
[52] U.S. Cl. ............................ 52/208; 52/396.04; 296/201
[58] Field of Search .......................... 52/204.62, 396.04, 52/396.05, 396.06, 395, 465, 466, 467, 468, 208, 204.592, 204.597, 204.593, 204.599; 296/93, 146.15, 201, 200; 156/108, 242

[56] References Cited

U.S. PATENT DOCUMENTS 4,103,052  7/1978  Summers et al.
5,062,248  11/1991  Kunert ................................. 52/208

Primary Examiner—Creighton Smith
Attorney, Agent, or Firm—Pennie & Edmonds

[57] ABSTRACT

A detachable mounting of a window pane to a frame of a window opening is disclosed for use primarily in motor-vehicles. The window pane is provided on its edges with a profiled frame made of elastomer. This profiled frame has a U-shaped segment with an opening facing the fixing rim of the frame of the window opening, the internal cross-section of the segment widening outwards, so as to receive a mounting bead of adhesive. The flanges of the U-shaped segment are themselves provided on the inside with retaining projections. The profiled frame and the bead of adhesive do not adhere to each other, the joint being provided solely by mechanical interlocking between the retaining projections and the bead of adhesive after it cures. Because of the shape of the profiled frame, the window pane may be re-installed after having been temporarily removed from the window frame by pressing it toward the cured bead of adhesive which remains attached to the fixing rim, until there is complete interlocking of the two elements beyond the retaining projections.

16 Claims, 1 Drawing Sheet

DETACHABLE ADHESIVE MOUNTING OF A WINDOW PANE TO A FRAME

FIELD OF THE INVENTION

This invention relates to a window pane, intended in particular for use in motor vehicles, ready to be mounted to a frame of a window opening by adhesive bonding and provided for this purpose with a profiled frame made of elastomer.

BACKGROUND OF THE INVENTION

A motor-vehicle window pane of the type ready to be mounted by adhesive bonding, is described in European Patent Application 620,134. The motor-vehicle window pane of this prior art application has attached to it a profiled frame segment having a groove with a U-shaped cross-section resembling a fir tree shape, so that the groove in fact narrows down from the bottom of the groove towards its opening.

Pre-fabricated window panes of the above type are very useful because it is in fact possible, after installation, to easily demount such panes by pulling upwards, without damaging the bead of adhesive as is generally the case for other adhesively bonded window panes. The flanges of the U-shaped profile in this case move apart due to the effect of mechanical pressure and are easily detached from the cured adhesive bead.

Once it has been demounted, the window pane can be reused, which represents a considerable advantage during the process of manufacturing motor vehicles, for example in cases when it in necessary to redo the painting in the vicinity of the frame of a window, in which cases the corresponding window pane has to be demounted.

Nevertheless, in these prior art cases, before reinstalling the window pane it is necessary to remove, by means of a mechanical cutting tool, the bead of cured adhesive which is attached to the rim of the window frame and then to deposit a new fitting adhesive bead into the groove of the U-shaped profile attached around the periphery of the window pane before remounting it. Furthermore, immediately after the window pane has been mounted, it should not support even small loads; in fact it is recommended that the mounting should not experience any mechanical stress during the period of curing of the new adhesive mass. This requirement constitutes a major constraint on the re-use of such window panes.

SUMMARY OF THE INVENTION

The object of the present invention is to provide an improved window pane of the above type for use primarily in motor-vehicles, so as to facilitate its remounting after the window pane is first demounted. It is another object of the present invention to reduce considerably the waiting time that is ordinarily required in order for the mounting of the fitted window pane to achieve its maximum strength.

In accordance with the present invention, these and other objectives can be achieved by means of a novel window pane, in particular a motor-vehicle window pane, intended to be mounted in and demounted from window openings. The window pane of the present invention is equipped with a peripheral profiled frame made of elastomer which includes a groove intended to receive an adhesive fitting bead which adheres to the rim of the window opening and which bead cures after the window pane has been put into place. The flanges forming the groove in the profiled frame have at least one projection so as to retain the adhesive bead. The connection between the elastomer frame and the adhesive bead is secured by mechanical interlocking. In addition, the materials of which the peripheral frame and the adhesive bead are made of, as well as the shape of the groove, are selected in such manner that after the adhesive bead has cured it can be extracted from the groove without damage. In a preferred embodiment of realizing the present invention the groove of the profiled frame has a flared, substantially U-shaped, cross-section which includes at least one projection near the mouth of the groove. Preferably, the depth of the groove below the projection is greater than the thickness of the projection. Furthermore, the peripheral frame advantageously includes at least one cavity in the vicinity of the bottom of the groove.

Thus, in accordance with the present invention, the transverse shape of the profiled frame intended to receive the mounting adhesive bead is geometrically designed so that due to the elasticity of the polymeric material of which it is made, that is to say the elastic flexibility of the flanges of the U-shaped profile and of their retaining projections, the window pane equipped with such profiled frame can not only be detached from the bead of cured adhesive but subsequently can also be reattached to the same mounting adhesive bead by applying mechanical pressure.

In this way, the window pane can be reinstalled in a very short period of time, the mounting having its original strength as soon as the window pane is reinstalled, so that any necessary handling or any other load may be applied immediately afterwards.

The geometry of the transverse shape of the profiled frame may, of course, be subject to many variations. This shape can be adapted to the elastic properties of the polymer used and may depend on the dimensions of the profiled frame that is employed. In certain cases, it may be necessary to perform several tests in order to obtain a most favorable transverse shape. The same applies to obtaining the proper geometry, dimensions and number of retaining projections. Thus, for example, where appropriate it may suffice to use a single retaining projection. However, for reasons of symmetry, it is preferable to provide both flanges of the U-shaped profile with one or even several of these projections.

BRIEF DESCRIPTION OF THE DRAWINGS

Other characteristics and advantages of this invention will become apparent in the detailed description of the preferred embodiments below, these also being illustrated in the drawings in which.

DESCRIPTION OF THE PREFERRED EMBODIMENTS

Figure 1:
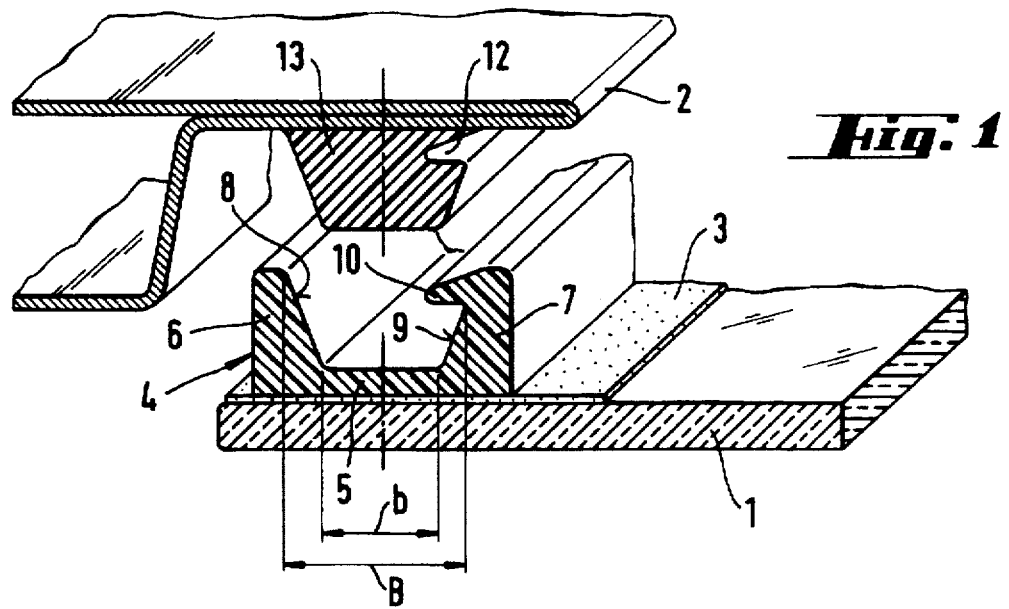
FIG. 1 is a cross-section of a disengaged mounting in accordance with one embodiment of the present invention in which one retaining projection is provided.

According to the present invention, the profiled frame has a segment with a U-shaped cross-section opening towards the fixing rim of the frame of the window opening. This U-shaped segment is designed to receive a bead of mounting adhesive attached to the rim of the frame and provides a detachable joint between the window pane and the frame by mechanical interlocking between retaining projections on the flanges of the U-shaped segment of the profiled frame and the cured bead of mounting adhesive.

In order for the detachable mounting in accordance with the invention to operate properly, it is necessary that the two parts of the joint, namely the profiled frame having a U-shaped groove and the adhesive bead used for mounting the window pane, do not adhere to each other but that the window pane be fixed to the window frame only by the mechanical retention of the cured adhesive bead within the groove and its inward projections. This assumes that a material not adhering to that of the profiled frame be used as adhesive mass when mounting. European Patent Application 620,134 discloses materials suitable for this use. In addition, it is possible to make the profiled frame of a thermoplastic polyolefin elastomer such as those based on isotactic polypropylene and ethylene-propylene-diene rubber. A particularly preferred material, for example, is Santoprene produced by Advanced Elastomer Systems. The material used as mounting adhesive can be made from a one-component polyurethane system curing on contact with moisture, such as, for example, Betaseal from Gurit-Essex. Because of their elastic and anti-blocking properties, both these materials give rise in fact to particularly favorable conditions when used in combination as disclosed herein.

In the following preferred embodiments of the present invention, the profiled frame has an U-shaped cross-section and in each case is placed on the window pane. However, the principles of the invention may also be employed so that, conversely, the profiled frame is located on the fixing rim, while the mounting adhesive mass itself adheres to the window pane. In general, however, it is preferable for technical reasons to equip the window pane with the profiled frame. This is due to the fact that in most cases it is advantageous to deposit the frame on the window pane in the factory where it is manufactured or packaged.

Generally, the process of manufacturing the profiled frame is of little importance with regard to the proper operation of the system for fitting the glass pane in accordance with the invention. Thus, in the case where the grooved profiled frame is fitted to the fixing rim of the motor-vehicle body, a prefabricated frame made of an appropriate elastomer, possessing the U-shaped cross-section of the invention, may simply be adhesively bonded to the fixing rim and then the fitting adhesive bead may be extruded onto this same rim into the U-shaped groove using a suitable extrusion device. The window pane is then made to adhere to the adhesive bead in the factory where the glass pane is fitted to the vehicle.

If, on the other hand, the profiled frame has to be fixed to the window pane, it is necessary to manufacture it beforehand and then utilize an adhesive to bond it to the window pane, or else to extrude it directly onto the latter. It is also possible to manufacture the profiled frame on the window pane by means of encapsulation or injection-molding techniques, or alternatively by using the RIM (Reaction Injection Molding) process. It should be noted that all these processes form part of techniques which are well-known in the art today.

FIG. 1 shows a first type of elastomer frame/fitting mastic mounting in accordance with a preferred embodiment of the present invention. This illustration is a sectional view of the peripheral region of the (motor-vehicle) window pane 1 and of the fixing rim 2 of the frame of the window opening in a body, to which the window pane 1 has to be fixed by adhesive bonding.

The window pane 1 is shown in this case in its monolithic form, that is to say as a sheet of toughened safety glass. However, multi-component window panes, such as laminated glass, can also be used in accordance with the present invention. In the region of the edge facing the fixing rim 2, window pane 1 is provided with a coating 3, in the shape of the frame and made, for example, of an enamel such as a colored stoved enamel. After an appropriate treatment of the coating 3 by means of suitable adhesion promoters the profiled elastomer frame 4 forms a strong adhesive bond to the coating 3.

The profiled frame 4 may, for example, be manufactured by means of an extrusion process, with an appropriate thermoplastic elastomer being extruded onto the pane 1. This process, as well as a device suitable for carrying it out, are described in European Patent Application 620,134.

In the embodiment shown in FIG. 1, the profiled frame 4 essentially possesses a transverse structure having a U-shaped groove composed of a base 5 and two flanges 6 and 7. The groove is flared, that is to say the internal face 8 of the flange 6 and the internal face 9 of the flange 7 are inclined outwards so that the width b of the base 5 is appreciably less than the gap B separating the upper ends of the flanges 6 and 7 at the point where they are furthest apart. A retaining projection 10 oriented inwards, that is to say towards the channel-shaped cavity of the profile, is placed on the edge of the flange 7.

In order to effect mounting by adhesive bonding, the bead of adhesive by which the window pane has to be connected to the rim of the window opening 2 is injected in a paste form into the U-shaped groove of the profiled frame 4.

After the groove is filled with the adhesive mass, window pane 1 is applied to the fixing rim 2 of the window opening. Thus, this adhesive mass entirely fills the groove of the profiled frame 4 and at the same time extends out to adhere to the rim 2 of the window frame. However, as indicated above, the materials for the profiled frame and for the adhesive mass are selected so that no adhesion occurs between the adhesive mass and the profiled frame 4. One of ordinary skill in the art is aware of the appropriate materials which achieve this feature. After the adhesive mass has cured, the joint is obtained exclusively by the mechanical interlocking of the retaining projection 10 and the corresponding recess 12 in the bead of cured adhesive 13.

In the embodiment shown in FIG. 1, the window pane can be detached from its mounted position after the bead of adhesive 13 has been fully cured. As described above, the materials of the peripheral profiled frame and of the fitting adhesive bead as well as the shape of the groove are such that, after curing, the fitting bead can be extracted from the groove without damage to the bead or profile. The detached window pane can subsequently be reinstalled in its mounted position simply by applying mechanical pressure to interlock the bead into the profile.

In particular, it is preferred to have the transverse shape of the bead of cured adhesive 13 correspond to the internal transverse shape of the profiled frame 4, with the adhesive bead having a narrow edge which tapers toward a larger base and the channel of the profiled frame with a wider opening than base. Thus, the adhesive bead 13 can be inserted with its protruding narrow edge into the upwardly widened channel of the profiled frame 4. The retaining projection 4 and/or the flange 7 yield in an elastic manner during this process, until the bead 13 is completely inserted within the groove of profiled frame 4. In this position, the retaining projection 10 snaps back, re-entering the corresponding slot-shaped recess 12, and thus re-establishing the original joint between the window pane and the fixing rim 2 of the window opening.

As seen in FIG. 1, the thickness of the projection 10 is preferably smaller than the depth of the channel underneath. This characteristic is important because as a consequence of it the projection 10 in the groove of the profiled frame 4 bonded to the window pane (insofar as the two materials have similar elastic moduli) deforms more easily than that part of the cured adhesive bead located below its slot 12 (which corresponds exactly to the projection in the groove). It follows that, when the two elastomers are separated, it is the more flexible projection 10 which deforms elastically, thereby preventing the bead 13 from undergoing permanent deformation and/or tearing which would be the case if the projection were substantially thicker.

Figure 2:
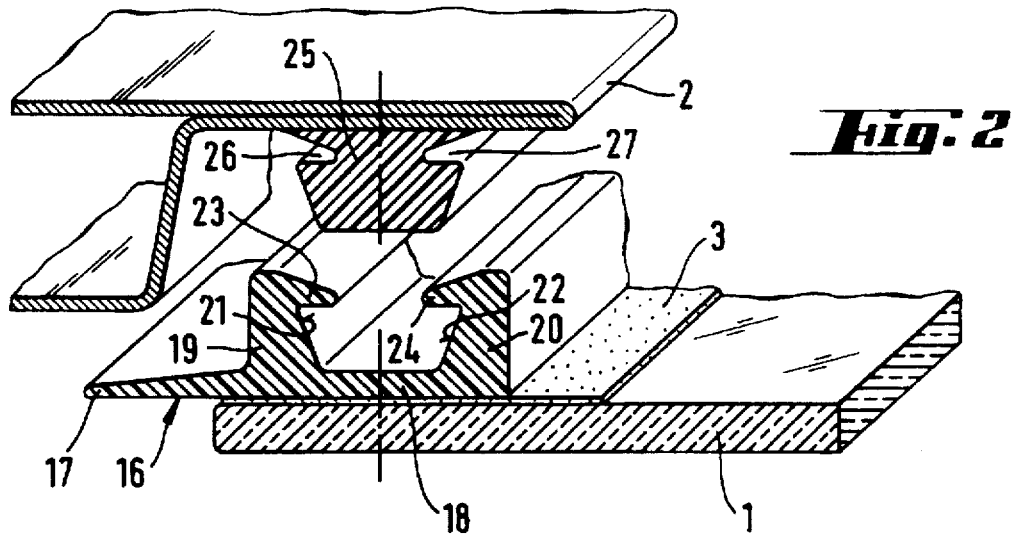
FIG. 2 is a cross-section of a disengaged mounting in accordance with a second embodiment of the present invention in which two retaining projections are provided.

For the embodiment shown in FIG. 2, the profiled frame 16, with which the window pane 1 is provided, also has a transverse structure having a groove. In addition, in this case profiled frame 16 is also equipped with a lip 17 which extends beyond the perimeter of the window pane 1 and which acts as a sealing and centering lip when the window pane is installed in the window opening.

This lip 17 furthermore makes it possible to hold the window pane 1 firmly in position in the window frame during the period of curing of the mounting adhesive, so that it is not necessary to use other accessories to immobilize the window pane.

In the embodiment shown in FIG. 2 the groove of the profile 16 is similarly composed of a base 18 and two flanges 19 and 20. Their internal faces 21 and 22 are also inclined so that the channel-shaped cavity is flared upwards. The flanges 19 and 20 are each provided with a retaining projection facing inwards, respectively bearing the numbers 23 and 24. These projections 23 and 24 provide the mechanical joint between the profiled frame 16 and the bead of cured adhesive 25, since they penetrate into the slot-shaped recesses respectively numbered 26 and 27.

The dimensions and the geometrical shape of the retaining projections 23 and 24, of the flanges 19 and 20 of the profiled frame 16, as well as the elastic properties of the constituent material of the two elements 30, 37, are again determined with respect to each other so that, on the one hand, an interlocking joint is formed when installing the window pane 1 in the window frame provided with the bead of cured adhesive 25 and, on the other hand, the joint thus obtained has the desired strength and that, when extracting the window pane, neither of the two associated elements undergoes any permanent deformation or rupture.

Figure 3:
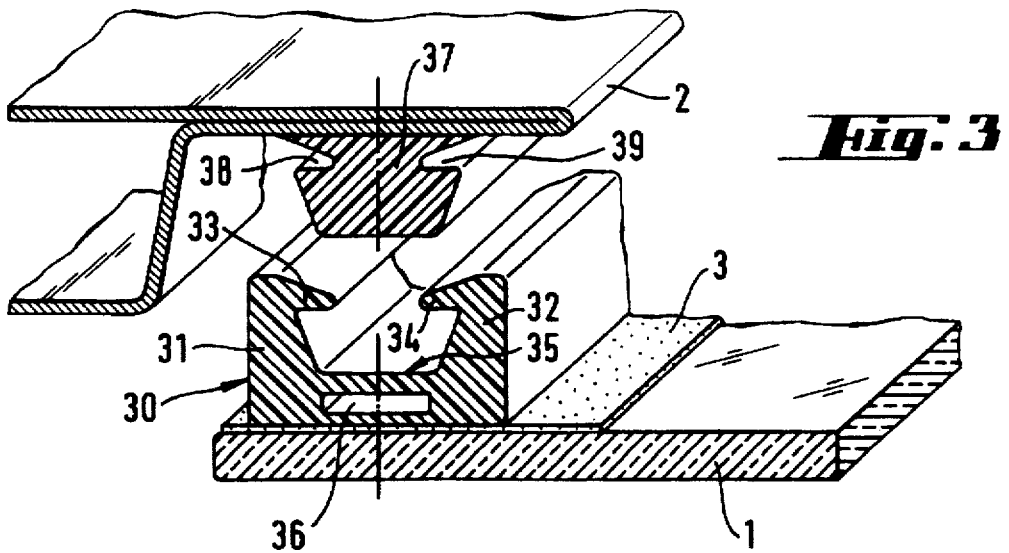
FIG. 3 illustrates another embodiment of the mounting shown in FIG. 2.

Turning next to the embodiment shown in FIG. 3, flanges 31 and 32 of the profiled frame 30, including the projections 33 and 34, have the same dimensions and the same geometrical shape as the embodiment exemplified in FIG. 2. However, this time the base 35 of the profiled frame 30 is also provided with a cavity 36. As shown in FIG. 3, cavity 36 is positioned beneath the bottom of the groove, and has a rectangular cross-section even though other cross-section shapes are also possible. Cavity 36 is there simply to increase the flexibility of the profiled frame when the side walls of the groove 31, 32 move apart in order to let in the cured bead 37.

This cavity 36 in fact allows the base 35 to yield more easily when the profiled frame 30 is pushed against the bead of cured adhesive 37. It is therefore possible in this way to make it easier to insert the retaining projections 33 and 34 into the corresponding slotted recesses (38 and 39).

Numerous modifications and variations of the present invention are clearly possible in light of the above teachings. It is therefore to be expressly understood that within the scope of the appended claims the invention may be practiced otherwise than specifically described above.

What is claimed is:

1. A mounting for attaching a window pane to a window frame, comprising:
   a) an adhesive bead having a recess thereon; and
   b) a profiled frame segment comprising a base and two flanges, wherein:
      i) the flanges are connected to the base and define a groove;
      ii) at least one of the flanges has an inward projection engaging the recess on the adhesive bead, said inward projection having a thickness;
      iii) the groove receives the adhesive bead and has a depth below the inward projection which is greater than the thickness of the inward projection; and
      iv) the adhesive bead is capable of being adhered to a window pane and the profiled frame segment is capable of being adhered to a window frame or, alternatively, the adhesive bead is capable of being adhered to a window frame and the profiled frame segment is capable of being adhered to a window pane, so that the window pane can be attached to or detached from the window frame by applying a mechanical force to the adhesive bead or profiled frame segment;

wherein said profiled frame segment is made of a thermoplastic elastomer and said adhesive bead is made of a reactive polymer which does not bond to the thermoplastic elastomer.

2. The mounting of claim 1 wherein the groove has a flared cross-section.

3. The mounting of claim 1 wherein said profiled frame segment is made of isotactic polypropylene and ethylene-propylene-diene rubber and said adhesive bead is made of a moisture-polymerizing one-component polyurethane.

4. A mounting for attaching a window pane to a window frame, comprising:
   a) an adhesive bead having a recess thereon; and
   b) a profiled frame segment comprising a base and two flanges, wherein:
      i) the base has at least one cavity within it;
      ii) the flanges are connected to the base and define a groove;
      iii) at least one of the flanges has an inward projection engaging the recess on the adhesive bead;
      iv) the groove receives the adhesive bead; and
      v) the adhesive bead is capable of being adhered to a window pane and the profiled frame segment is capable of being adhered to a window frame or, alternatively, the adhesive bead is capable of being adhered to a window frame and the profiled frame segment is capable of being adhered to a window pane, so that the window, pane can subsequently be attached to or detached from the window frame by applying a mechanical force to the adhesive bead or profiled frame segment; wherein the profiled frame segment further has at least one cavity positioned near the base of said segment.

5. A mounting for attaching a window pane to a window frame, comprising:
   a) an adhesive bead having a recess thereon; and
   b) a profiled frame segment comprising a base, two flanges and a lip, wherein:
      i) the flanges are connected to the base and define a groove;
      ii) at least one of the flanges has an inward projection engaging the recess on the adhesive bead;

iii) the groove receives the adhesive bead;
iv) the adhesive bead is capable of being adhered to a window pane and the profiled frame segment is capable of being adhered to a window frame having a perimeter or, alternatively, the adhesive bead is capable of being adhered to a window frame and the profiled frame segment is capable of being adhered to a window pane having a perimeter, so that the window pane can be attached to or detached from the window frame by applying a mechanical force to the adhesive bead or profiled frame segment; and
v) the lip extends from the base of the profiled frame segment to beyond the perimeter of the window pane or, alternatively, to beyond the perimeter of the window frame, depending on whether the profiled frame segment is attached to a window pane or window frame.

6. A window pane adapted to be detachably mounted onto a window frame, comprising:
   a) a profiled frame segment; and
   b) a window pane which has a rim portion, wherein:
      i) the profiled frame segment:
         A) is adhered to the rim portion of the window pane and comprises a base and two flanges, wherein:
            1) the flanges are connected to the base and define a flared groove;
            2) at least one of the flanges has an inward projection having a thickness and engaging a recess on an adhesive bead which is attached to a window pane; and
            3) the groove receives the adhesive bead and has a depth below the inward projection which is greater than the thickness of the inward projection, such that the window pane can be attached to or detached from a window frame by applying a mechanical force to the profiled frame segment or adhesive bead;
   wherein said profiled frame segment is made of a thermoplastic elastomer and said adhesive bead is made of a reactive polymer which does not bond to the thermoplastic elastomer.

7. The window pane of claim 6 wherein said groove has a flared cross-section and a depth below said inward projection which is greater than the thickness of the projection.

8. The window pane of claim 6 wherein both flanges have inward projections.

9. A window pane adapted to be detachably mounted onto a window frame, comprising:
   a) a profiled frame segment; and
   b) a window pane which has a rim and a perimeter, wherein:
      i) the profiled frame segment:
         A) is adhered to the rim of the window pane and comprises a base, two flanges and a lip, wherein:
            1) the flanges are connected to the base and define a flared groove;
            2) at least one of the flanges has an inward projection engaging a recess of an adhesive bead which is attached to a window frame; and
            3) the lip extends from the base of the profiled frame segment to beyond the perimeter of the window pane,
   such that the window pane can be attached to or detached from the window frame via the adhesive bead by applying a mechanical force to the profiled frame segment or adhesive bead.

10. A method of removably installing a window pane in a window frame which comprises either of the following steps:
   a) applying an adhesive bead-forming material comprising a reactive polymer onto a window pane; and
   b) extruding a profiled frame segment comprising a thermoplastic elastomer onto a window frame which has a perimeter,
   or, alternatively,
   a') applying an adhesive bead-forming material comprising a reactive polymer onto a window frame; and
   b') extruding a profiled frame segment comprising a thermoplastic elastomer onto a window pane which has a perimeter, wherein, in accordance with steps a and b or, alternatively, steps a' and b', the profiled frame segment comprises a base and two flanges, wherein:
      i) the flanges are connected to the base and define a groove;
      ii) at least one of the flanges has an inward projection and a thickness; and
   c) positioning the adhesive bead-forming material in the groove of the profiled frame segment and thereafter curing the adhesive bead-forming material in such a way that an adhesive bead forms therein which has a recess and a projection which forms a mechanical interlock with the inward projection of the profiled frame segment, wherein the reactive polymer of the adhesive bead does not bond to the thermoplastic elastomer of the profiled frame segment;
   such that the window pane is attached to or detached from the window frame by applying a mechanical force to the profiled frame segment or adhesive bead.

11. The method of claim 10 wherein an enamel coating is initially applied to the window pane.

12. The method of claim 10 wherein the groove has a flared cross-section.

13. The method of claim 10 which further comprises configuring the profiled frame segment to have a lip extending either beyond the perimeter of the window pane or, alternatively, extending beyond the perimeter of the window frame, depending on whether the profiled frame segment is extruded on the window pane or window frame.

14. The method of claim 10 wherein both flanges have an inward projection.

15. The method claim 10 wherein the groove of the profiled frame segment has a depth below the inward projection which is greater than the thickness of the inward projection.

16. A window pane adapted to be detachably mounted onto a window frame, comprising:
   a) a profiled frame segment; and
   b) a window pane which has a rim, wherein:
      i) the profiled frame segment:
         A) is adhered to the rim of the window pane, is made of a thermoplastic elastomer and comprises a base and two flanges, wherein:
            1) the base has at least one cavity within it positioned near the base of the segment;
            2) the flanges are connected to the base and define a flared groove; and
            3) at least one of the flanges has an inward projection engaging a recess on an adhesive bead which is made of a reactive material and is adapted to be attached to a window frame,
            4) the reactive polymer of the adhesive bead does not bond to the thermoplastic elastomer of the profiled frame segment;
   such that the window pane can subsequently be attached to or detached from a window frame by applying a mechanical force to the adhesive bead or profiled frame segment.

* * * * *